US012017448B2

(12) United States Patent
Matsunaga

(10) Patent No.: US 12,017,448 B2
(45) Date of Patent: Jun. 25, 2024

(54) ROLL PAPER PRINTER

(71) Applicant: SEIKO EPSON CORPORATION, Tokyo (JP)

(72) Inventor: Hideki Matsunaga, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/072,087

(22) Filed: Nov. 30, 2022

(65) Prior Publication Data

US 2023/0166537 A1 Jun. 1, 2023

(30) Foreign Application Priority Data

Dec. 1, 2021 (JP) ................................ 2021-195269

(51) Int. Cl.
*B41J 11/36* (2006.01)
*B41J 11/00* (2006.01)

(52) U.S. Cl.
CPC .............. *B41J 11/36* (2013.01); *B41J 11/003* (2013.01); *B41J 11/0055* (2013.01); *B41J 11/007* (2013.01)

(58) Field of Classification Search
CPC ....... B41J 11/36; B41J 11/003; B41J 11/0055; B41J 11/007
See application file for complete search history.

(56) References Cited

U.S. PATENT DOCUMENTS

| | | | | |
|---|---|---|---|---|
| 5,566,906 | A * | 10/1996 | Kamada | B65H 23/34 242/615 |
| 5,717,836 | A * | 2/1998 | Horie | B65H 23/34 399/385 |
| 2002/0109740 | A1* | 8/2002 | Rasmussen | B41J 11/008 347/14 |
| 2008/0310903 | A1* | 12/2008 | Kohyama | B41J 11/0045 400/613 |
| 2017/0121142 | A1* | 5/2017 | Hagi | B41J 15/04 |
| 2018/0101118 | A1* | 4/2018 | Hiroe | G03G 15/652 |
| 2022/0097421 | A1* | 3/2022 | Matsunaga | B41J 11/70 |

FOREIGN PATENT DOCUMENTS

| | | |
|---|---|---|
| JP | 2010-052405 A | 3/2010 |
| JP | 2010-099852 A | 5/2010 |

* cited by examiner

*Primary Examiner* — David H Banh
(74) *Attorney, Agent, or Firm* — Harness, Dickey & Pierce, P.L.C.

(57) ABSTRACT

A roll paper printer includes an accommodation section configured to accommodate roll paper wound such that one surface of recording paper faces outward, a transport roller configured to pull the recording paper from the roll paper and transport the paper in a transport direction, a guide positioned upstream of the transport roller in the transport direction and configured to come into contact with the other surface of the recording paper, and a protrusion positioned upstream of the transport roller in the transport direction and configured to come into contact with the one surface of the recording paper, the protrusion being configured to move toward the guide.

8 Claims, 4 Drawing Sheets

ROLL PAPER PRINTER

The present application is based on, and claims priority from JP Application Serial Number 2021-195269, filed Dec. 1, 2021, the disclosure of which is hereby incorporated by reference herein in its entirety.

BACKGROUND

1. Technical Field

The present disclosure relates to a roll paper printer.

2. Related Art

Printers that adjust the tension of paper pulled from roll paper, such as a printer described in JP-A-2010-52405, are known. Printers that flatten curled paper pulled from roll paper, such as a printer described in JP-A-2010-99852, are also known.

To adjust the tension of paper pulled from roll paper and flatten the curled paper, printers having both types of the above-described functionality are to be used, resulting in large, complex printers.

SUMMARY

According to an aspect of the present disclosure, a roll paper printer includes an accommodation section configured to accommodate roll paper, a transport roller configured to pull recording paper from the roll paper and transport the recording paper in a transport direction, the recording paper having a first surface and a second surface, a guide positioned upstream of the transport roller in the transport direction and configured to come into contact with the second surface of the recording paper, and a protrusion positioned upstream of the transport roller in the transport direction and configured to come into contact with the first surface of the recording paper, the protrusion configured to move toward the guide.

DESCRIPTION OF EXEMPLARY EMBODIMENTS

1. First Embodiment

1-1. Roll Paper Printer Configuration

Figure 1:
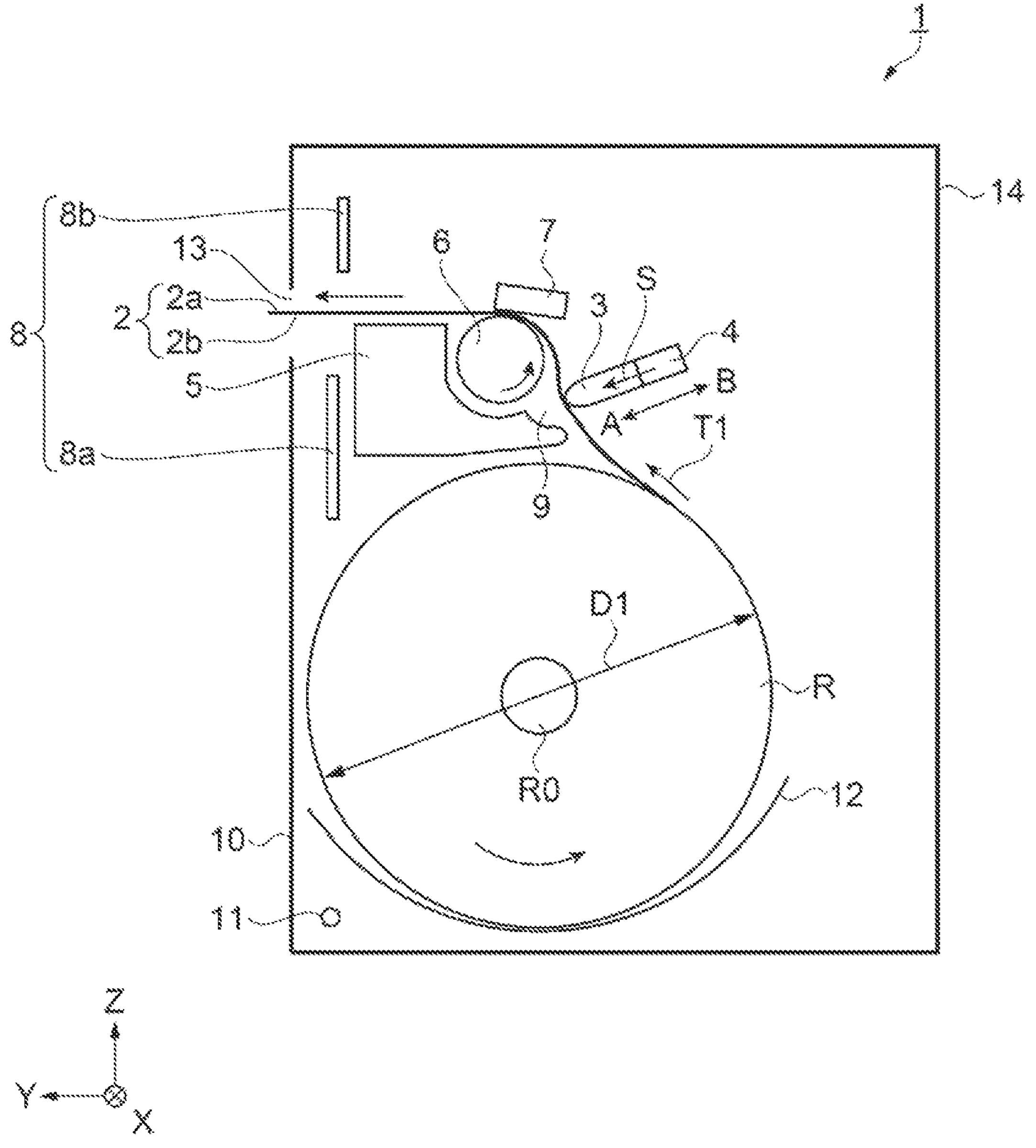
FIG. 1 is a cross-sectional view of a roll paper printer with large-diameter roll paper.

A roll paper printer 1 according to the embodiment is described with reference to FIG. 1 to FIG. 4. A three-dimensional coordinate system is used to indicate directions in the drawings. For the sake of simplicity, a positive Z-axis direction denotes upward or simply up, and a negative Z-axis direction denotes downward or simply down; a positive X-axis direction denotes rightward or simply right, and a negative X-axis direction denotes leftward or simply left; and a positive Y-axis direction denotes forward or simply front, and a negative Y-axis direction denotes rearward or simply rear.

The roll paper printer 1 according to the embodiment is used in, for example, point-of-sale (POS) systems. POS systems are used in operations in retail businesses, such as shopping centers, department stores, convenience stores, and in-vehicle sales, and in food service businesses, such as restaurants, coffee shops, and bars. The roll paper printer 1 used in such a POS system prints receipts, coupons, or tickets depending on products or services.

As illustrated in FIG. 1, the roll paper printer 1 includes a protrusion 3, a guide 5, a transport roller 6, a head 7, and a cutter 8. A hinge 11 is provided at the lower front of a case 14. A cover 10 is attached such that the cover 10 is rotatable about the hinge 11. The case 14 is provided with the protrusion 3, the head 7, a second blade 8*b* of the cutter 8, and an accommodation section 12, which is described below. The cover 10 is provided with the guide 5, the transport roller 6, and a first blade 8*a* of the cutter 8.

Recording paper 2 is, for example, elongated thermal paper. The recording paper 2 has a front surface 2*a* (a first surface) that is one side on which a heat-sensitive material is applied and image printing can be performed by using the head 7. A rear surface 2*b* (a second surface), which is the other side of the recording paper 2, comes into contact with the transport roller 6. The roll paper R is wound around a core RO such that the front surface 2*a* of the recording paper 2 faces outward and the rear surface 2*b* faces inward. The recording paper 2 that is closer to the core RO of the roll paper R, that is, the recording paper 2 that is wound where the roll paper R has a smaller outer diameter, curls more strongly. In the following description, the outer diameter is simply referred to as the diameter. The recording paper 2 has a width of, for example, 80 mm. The recording paper 2 may have a width of 58 mm. The recording paper 2 has a thickness of, for example, 0.06 mm to 0.08 mm. The core RO has a diameter of, for example, 18 mm.

The roll paper R can be accommodated in the accommodation section 12 disposed at a lower position in the case 14. The cover 10 can open or close the accommodation section 12. The user opens the cover 10 toward the user to access the accommodation section 12. The user opens the cover 10, mounts roll paper R in the accommodation section 12, pulls recording paper 2 from the roll paper R, and closes the cover 10 to set the recording paper 2 in the roll paper printer 1.

When the cover 10 is closed, the guide 5 attached to the cover 10 faces, with the recording paper 2 therebetween, the protrusion 3 attached to the case 14. This configuration forms a bending transport path 9 for the recording paper 2 as described below between the guide 5 and the protrusion 3 that face each other. When the cover 10 is closed, a rectangular discharge slot 13 is also formed between the cover 10 and the case 14.

When the cover 10 is closed, the transport roller 6 attached to the cover 10 faces, with the recording paper 2 therebetween, the head 7 attached to the case 14. This configuration enables the transport roller 6 to come into contact with the rear surface 2*b* of the recording paper 2 to transport the recording paper 2 and enables the head 7 to come into contact with the front surface 2*a* of the recording paper 2 for printing. The transport roller 6, which is disposed to face the head 7 with the recording paper 2 therebetween, is also referred to as a platen roller. The first blade 8*a* of the cutter 8 attached to the cover 10 faces, with the recording paper 2 therebetween, the second blade 8*b* attached to the case 14. The first blade 8*a* is movable toward the second blade 8*b* to cut the recording paper 2 therebetween.

The head 7 is, for example, a line thermal head that has a plurality of heating elements aligned in the right-left direction. The heating elements of the head 7 are selected in accordance with print data and generate heat to print images on the recording paper 2, which is a thermal paper.

The transport roller 6 is rotated by a transport roller motor (not illustrated) in the counterclockwise direction indicated by the arrow. The transport roller 6 pulls the recording paper 2 from the roll paper R in the accommodation section 12 and transports the recording paper 2 via the transport path 9 in a transport direction, which is indicated by the arrow, from the transport roller 6 and the head 7 toward the discharge slot 13 and the cutter 8. As the recording paper 2 is pulled, the roll paper R is also rotated in the counterclockwise direction indicated by the arrow. The accommodation section 12, the transport path 9 formed by the guide 5 and the protrusion 3, the transport roller 6 and the head 7, the cutter 8, and the discharge slot 13 are disposed in this order from upstream to downstream in the transport direction.

The protrusion 3 is movable in an A direction, which is a first direction, or a B direction, which is a second direction. More specifically, the protrusion 3 can move forward in the A direction toward the guide 5 or move rearward in the B direction away from the guide 5. The B direction is opposite to the A direction. The protrusion 3 is attached to an elastic member 4. The protrusion 3 is pressed in the A direction by a pressing force S of the elastic member 4. The elastic member 4 is elastic and may include a spring, rubber, or the like. The elastic member 4 is, for example, a compression coil spring. The elastic member 4 is fixed to the case 14 at one end and can press the protrusion 3 in the A direction at the other end.

The protrusion 3 can be moved up to 6.0 mm in the B direction from a reference position at which no recording paper 2 is in the transport path 9 and the protrusion 3 is not in contact with the recording paper 2. This moving distance also corresponds to a distance by which the elastic member 4 can be compressed. The protrusion 3 extends in the direction of the paper width of the recording paper 2, which is a right-left direction. For example, the protrusion 3 extends for 80 mm in the paper width direction, which corresponds to the paper width of the recording paper 2. The elastic member 4 may be disposed at at least each of the right and the left of the protrusion 3. Such elastic members 4 enable the protrusion 3 to apply a pressing force S of the elastic members 4 in a balanced manner in the paper width direction with respect to the recording paper 2. The guide 5 also extends in the direction of the paper width of the recording paper 2, similarly to the protrusion 3.

A tension T1 is applied in the arrow direction, which is the same direction as the transport direction, to the recording paper 2 that is pulled from the roll paper R by the transport roller 6. This tension T1 causes the recording paper 2 to come into contact with the protrusion 3 and press the protrusion 3 in the B direction.

1-2. Large-Diameter Roll Paper

Figure 2:
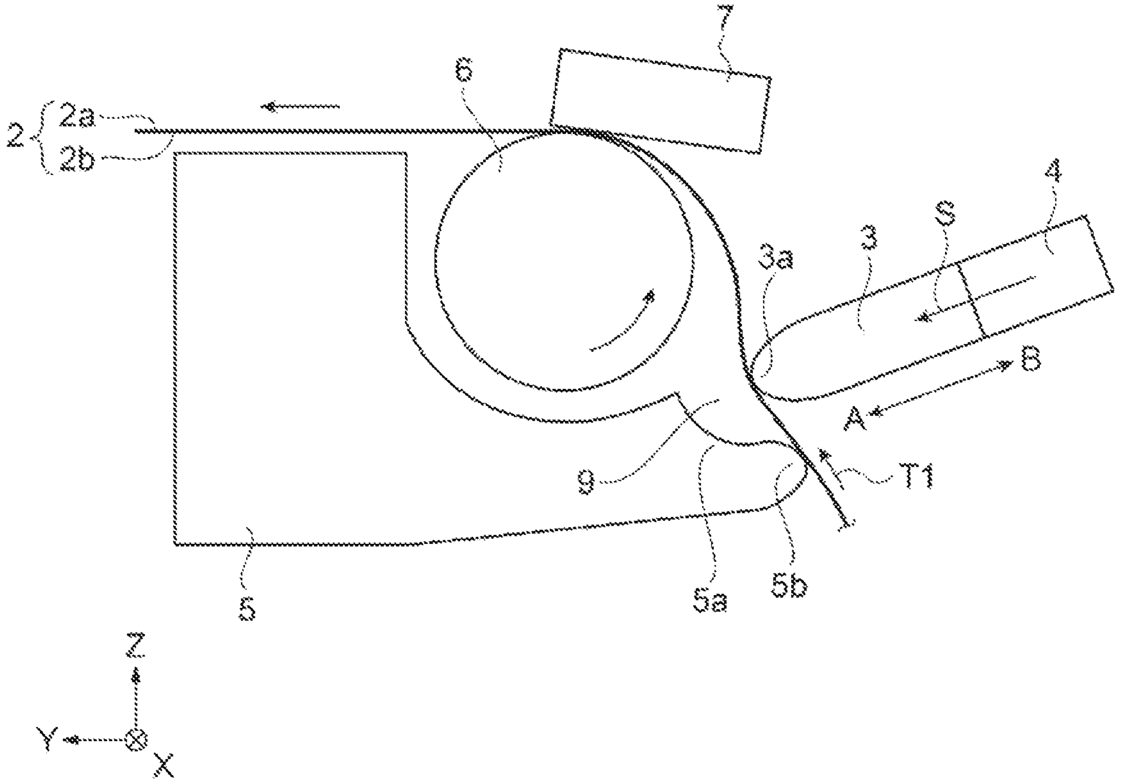
FIG. 2 is an enlarged view illustrating a transport path for large-diameter roll paper.
Figure 3:
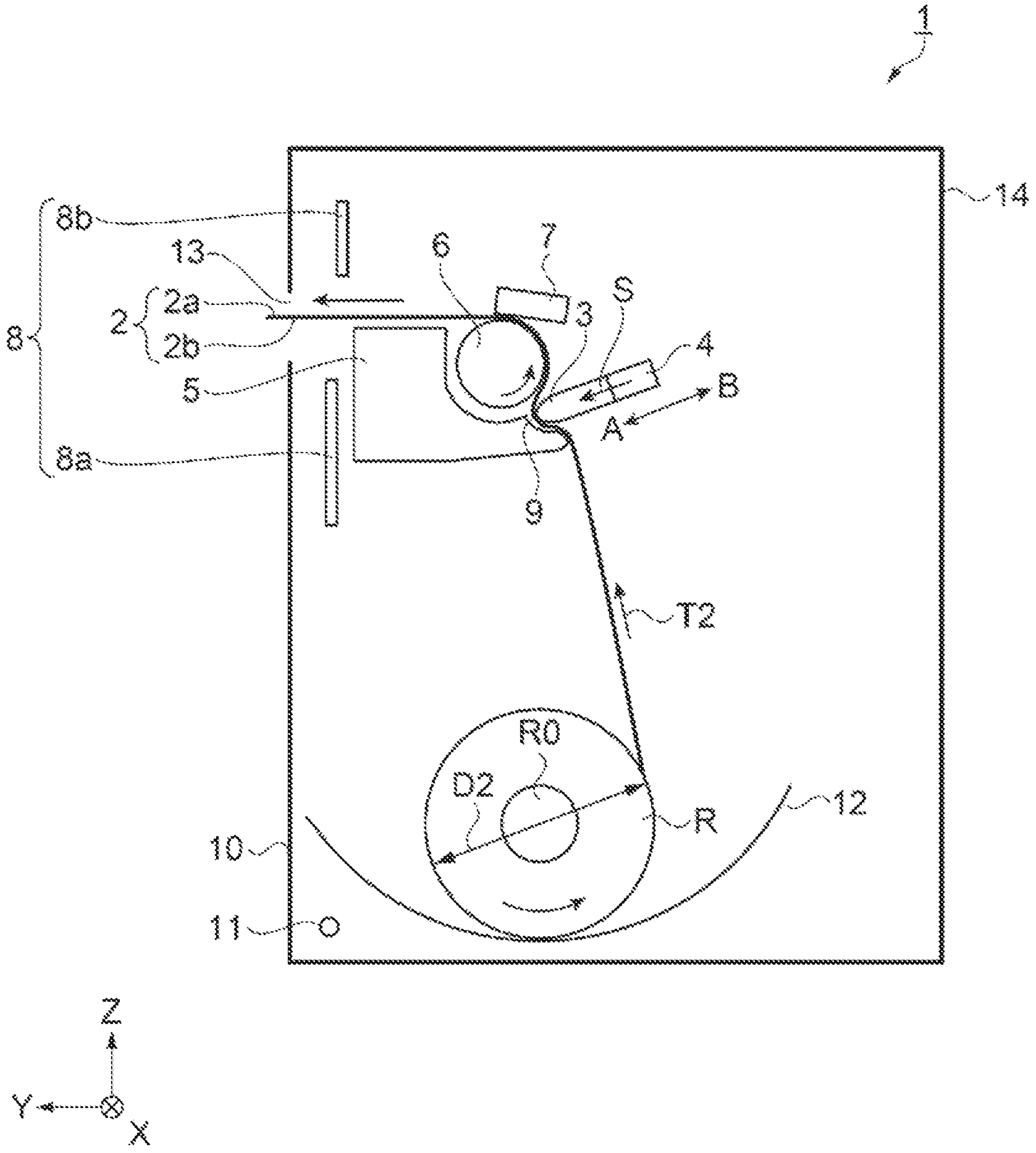
FIG. 3 is a cross-sectional view of a roll paper printer with small-diameter roll paper.
Figure 4:
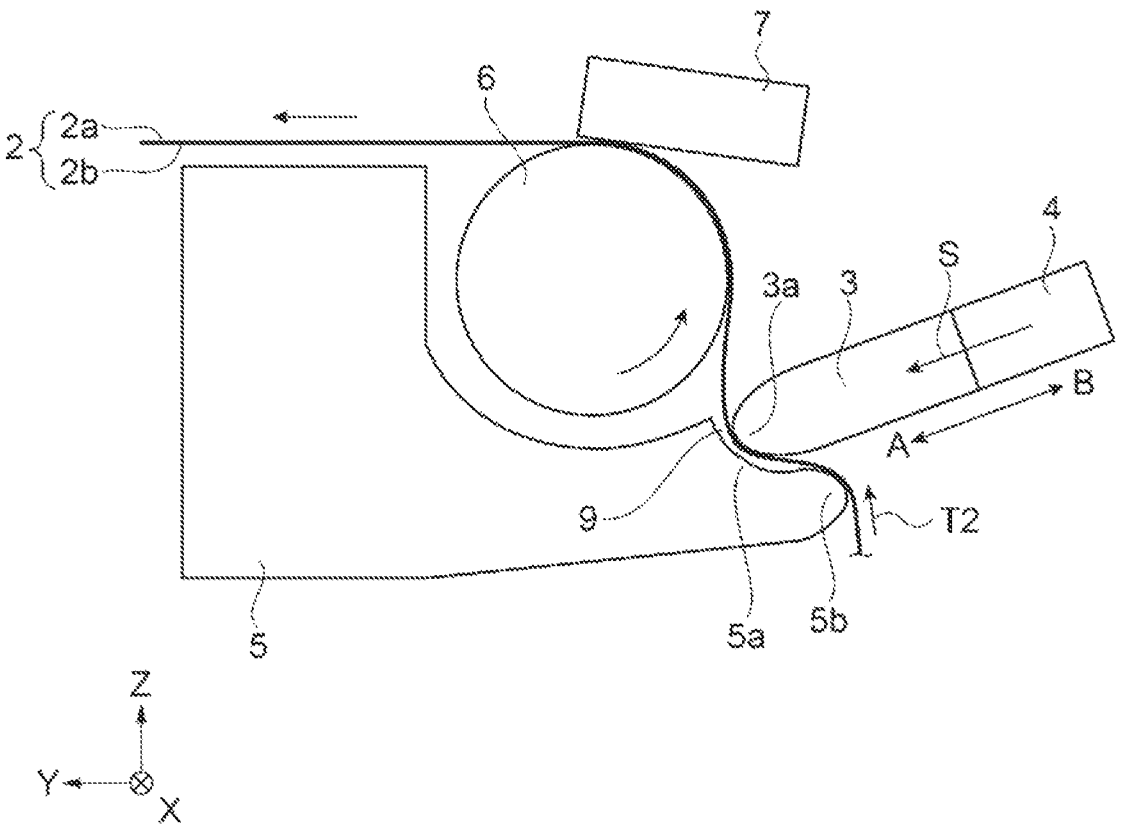
FIG. 4 is an enlarged view illustrating a transport path for small-diameter roll paper.

FIG. 1 and FIG. 2 illustrate the roll paper R that has a large diameter D1. FIG. 3 and FIG. 4 illustrate the roll paper R that has a small diameter D2. Hereinafter, these examples are compared and described. It should be noted that in the following description, the diameter D1 of the roll paper R is simply referred to as a diameter D1, which is an example large diameter of the roll paper R, and the diameter D2 of the roll paper R is simply referred to as a diameter D2, which is an example small diameter of the roll paper R. The diameter D1 is, for example, 80 mm, and the diameter D2 is, for example, 30 mm.

The diameter D1 illustrated in FIG. 1 is larger than the diameter D2 illustrated in FIG. 3, and the roll paper R is thus large and heavy, and the load in transporting the recording paper 2 by using the transport roller 6 is also large. Accordingly, the tension T1 of the recording paper 2 illustrated in FIG. 1 and FIG. 2 is also larger than the tension T2 illustrated in FIG. 3 and FIG. 4.

Such a larger diameter D1 causes a rapid increase in load due to inertia of the roll paper R, in particular, when starting transportation of the recording paper 2 by using the transport roller 6, resulting in a rapid increase in the tension T1 of the recording paper 2. In such a case, when starting transportation of the recording paper 2 by using the transport roller 6, inertia is added to the load of the roll paper R, and the transport roller 6 may be unable to transport the recording paper 2.

The protrusion 3 is configured to come into contact with the front surface 2*a* of the recording paper 2 to enable the elastic member 4 to apply the pressing force S in the A direction while the protrusion 3 is receiving the tension T1 of the recording paper 2 and moving in the B direction, thereby easing the tension T1. In other words, the protrusion 3 presses the recording paper 2 in the A direction, which is opposite to the B direction, by applying the pressing force S of the elastic member 4 against the tension T1 that presses the recording paper 2 in the B direction, thereby canceling out opposing forces.

As the protrusion 3 is moved in the B direction, the elastic member 4 is compressed, and the pressing force S of the elastic member 4 increases. Accordingly, as the tension T1 of the recording paper 2 increases to press the protrusion 3 in the B direction, the pressing force S of the elastic member 4 in the A direction to press back the protrusion 3 also increases. As described above, the protrusion 3 is configured to ease the tension of the recording paper 2 in accordance with the magnitude of the tension of the recording paper 2, that is, in accordance with the size of the diameter of the roll paper R. Accordingly, the transport roller 6 can stably transport the recording paper 2 even when the diameter is large, such as the diameter D1. And even when inertia notably affects the tension T1 of the recording paper 2 to rapidly increase the tension T1 when starting transportation, the protrusion 3 can ease the tension T1, enabling the transport roller 6 to stably transport the recording paper 2.

As described above, when the transport roller 6 transports the recording paper 2, the recording paper 2 is pulled and the roll paper R is rotated in the counterclockwise direction in the accommodation section 12. When the roll paper R is rotated, the load of the transport roller 6 in transporting the recording paper 2 varies due to variations in friction between the roll paper R and the accommodation section 12. As a result, the tension T1 of the recording paper 2 also varies.

In particular, when the diameter is large, such as the diameter D1, the variation in the tension T1 also increases. When the tension T1 varies notably, the transport roller 6 may not be able to transport the recording paper 2 at a constant speed, resulting in deteriorated print quality. The constant speed for the transport roller 6 to transport the recording paper 2 is, for example, 500 mm per second. In such a case, the variation in the tension T1 of the recording paper 2 can be eased by using the pressing force S of the elastic member 4 while the protrusion 3 is moved in the A direction or B direction in accordance with the variation in the tension T1 of the recording paper 2. Accordingly, the transport roller 6 can transport the recording paper 2 at a constant speed.

Next, the case in which the roll paper R has the diameter D1 is described in detail focusing on the transport path 9 formed by the guide 5 and the protrusion 3, with reference to FIG. 2. The guide 5 has a recess 5*a* and a protrusion portion 5*b*, which protrudes upstream from the recess 5*a* in the transport direction. The recess 5*a* of the guide 5 faces a tip 3*a* of the protrusion 3. The recess 5*a* of the guide 5 is also referred to as a concave portion, and the protrusion portion 5*b* is also referred to as a convex portion.

The rear surface 2*b* of the recording paper 2 pulled from the roll paper R by the transport roller 6 comes into contact with the protrusion portion 5*b* of the guide 5, and the front surface 2*a* comes into contact with the tip 3*a* of the protrusion 3 positioned downstream in the transport direction and is transported, as illustrated in FIG. 2. Accordingly, the transport path 9 formed by the guide 5 and the protrusion 3 bends, and the curvature of the bend is variable, as described below.

The protrusion 3 is made of a resin such as a plastic. At least the tip 3*a* of the protrusion 3 at which the protrusion 3 comes into contact with the front surface 2*a* of the recording paper 2 is covered with a sheet containing ultra-high molecular weight polyethylene. Ultra-high molecular weight polyethylene has an increased molecular weight of 1,000,000 to 7,000,000, whereas the molecular weight of ordinary polyethylene is 20,000 to 3,000,000. Accordingly, friction produced when the tip 3*a* of the protrusion 3 comes into contact with the recording paper 2 can be reduced, and the load of the transport roller 6 in transporting the recording paper 2 can be reduced.

In FIG. 2, the diameter D1 is large, and the tension T1 of the recording paper 2 is also large to strongly press the protrusion 3 in the B direction. Accordingly, the protrusion 3 illustrated in FIG. 2 is retracted in the B direction compared with the protrusion 3 illustrated in FIG. 4 in which the diameter is the diameter D2. As a result, as illustrated in FIG. 2, the protrusion 3 is away from the guide 5, and the transport path 9 formed between the guide 5 and the protrusion 3 is wide compared with the transport path 9 in FIG. 4.

When the diameter is the diameter D1 illustrated in FIG. 2, an angle of the recording paper 2 around the tip 3*a* of the protrusion 3, that is, an angle formed between the recording paper 2 from the protrusion portion 5*b* of the guide 5 toward the tip 3*a* of the protrusion 3 and the recording paper 2 from the tip 3*a* of the protrusion 3 toward the transport roller 6, is larger than the angle formed when the diameter is the diameter D2 illustrated in FIG. 4. The angle of the recording paper 2 around the tip 3*a* of the protrusion 3 denotes the curvature of the bending transport path 9. When the diameter is the diameter D1, the curvature of the bending transport path 9 is larger than that when the diameter is the diameter D2, that is, the bend is gentle. Accordingly, when the diameter is the diameter D1, the transport path 9 bends gently compared with the transport path 9 when the diameter is the diameter D2, and the area in which the recording paper 2 is wound and in contact with the protrusion portion 5*b* of the guide 5 and the area in which the recording paper 2 is wound and in contact with the tip 3*a* of the protrusion 3 are thus small.

As described above, as the protrusion 3 is moved in the B direction, the elastic member 4 is compressed, and the pressing force S of the elastic member 4 increases. The protrusion 3 illustrated in FIG. 2 is further retracted in the B direction compared with the protrusion 3 in FIG. 4, increasing the pressing force S of the elastic member 4. Accordingly, even when the diameter is the diameter D1 and the tension T1 of the recording paper 2 rapidly increases when starting transportation, the protrusion 3 is located at the position to apply a strong pressing force S by using the elastic member 4, thereby immediately easing the tension T1.

1-3. Small-Diameter Roll Paper

A case in which the diameter D2 is smaller than the diameter D1 illustrated in FIG. 1 and FIG. 2 is described with reference to FIG. 3 and FIG. 4. As described above, the recording paper 2 curls strongly when the curled recording paper 2 is close to the core RO of the roll paper R and is wound at a position where the diameter is small, such as the diameter D2. In such a case, receipts, coupons, and tickets printed on such recording paper 2 also curl inward, that is, have a curled shape, and their quality as print products deteriorates. In addition, the recording paper 2 positioned downstream of the transport roller 6 and the head 7 in the transport direction is not regulated, and the curled recording paper 2 may be caught by the cutter 8 or the discharge slot 13.

The protrusion 3 applies the pressing force S of the elastic member 4 in the A direction to smooth the front surface 2*a* of the recording paper 2 being transported, thereby flattening the curled recording paper 2. The diameter D2 is smaller than the diameter D1, as illustrated in FIG. 3, and the roll paper R is thus light and the load in transporting the recording paper 2 by using the transport roller 6 is also small. Accordingly, the tension T2 of the recording paper 2 illustrated in FIG. 3 and FIG. 4 is smaller than the tension T1 illustrated in FIG. 1 and FIG. 2.

Next, the transport path 9 formed by the guide 5 and the protrusion 3 when the diameter D2 is smaller than the diameter D1 is described with reference to FIG. 4. In FIG. 4, the tension T2 of the recording paper 2 is smaller than the tension T1, and the pressing force S of the elastic member 4 presses the protrusion 3 in contact with the recording paper 2 further in the A direction, compared with the case in FIG. 2. Accordingly, the protrusion 3 illustrated in FIG. 4 proceeds further in the A direction compared with the protrusion 3 illustrated in FIG. 2.

As illustrated in FIG. 4, the protrusion 3 proceeds toward the guide 5 compared with the protrusion 3 in FIG. 2, and the transport path 9 formed between the guide 5 and the protrusion 3 is narrow. Accordingly, as illustrated in FIG. 4, an angle of the recording paper 2 around the tip 3*a* of the protrusion 3, that is, an angle formed between the recording paper 2 from the protrusion portion 5*b* of the guide 5 toward the tip 3*a* of the protrusion 3 and the recording paper 2 from the tip 3*a* toward the transport roller 6, is smaller than that in FIG. 2. As described above, the curvature of the bending transport path 9 illustrated in FIG. 4 is small, that is, the bend is sharp. Since the bend of the transport path 9 is sharp, the area in which the recording paper 2 is wound and in contact with the protrusion portion 5*b* of the guide 5 and the area in which the recording paper 2 is wound and in contact with the tip 3*a* of the protrusion 3 are thus large.

As the diameter decreases, for example, from the diameter D1 to the diameter D2, the protrusion 3 moves in the A direction and the bend of the transport path 9 becomes sharper, further bending the recording paper 2 in the direction for flattening the curled recording paper 2. In other words, the protrusion 3 moves with the change in the roll paper R, such as the change from the diameter D1 to the diameter D2. The bend of the transport path 9 formed between the guide 5 and the protrusion 3 facing each other changes with the movement of the protrusion 3. As a result, the transport path 9 bends sharper with the decrease in the diameter, such as the diameter D2, and with the increase in the degree of curl in the recording paper 2, further effectively flattening the curled recording paper 2.

It should be noted that the pressing force S of the elastic member 4 may be set to a higher level for a case in which the effect of inertia is notably large. More specifically, the pressing force S of the elastic member 4 may be set to a higher level than the level of the force pressing the recording paper 2 with the tension T1 at the time of starting transportation, as illustrated in FIG. 1 and FIG. 2. In such a case, even when the diameter is the diameter D1, the protrusion 3 moves in the A direction and can be at a position substantially the same as the position illustrated in FIG. 3 and FIG. 4. As a result, even when the diameter D1 is larger than the diameter D2, the transport path 9 can be bent sharply to flatten the curled recording paper 2, similarly to the case of the diameter D2.

The curvature of the tip 3*a* of the protrusion 3 for flattening curling may be 0.5 mm or greater and 2.2 mm or less. The curvature of the tip 3*a* for more effectively flattening curling may be 0.8 mm or greater and 1.0 mm or less. Regulating the curvature of the tip 3*a* of the protrusion 3 in such a manner enables the curled recording paper 2 to be flattened. As a result, the occurrence of degradation in quality of print products can be suppressed. In addition, the curled recording paper 2 can be prevented from being caught by the cutter 8 or the discharge slot 13.

The roll paper printer 1 according to the embodiment includes the protrusion 3 configured to come into contact with the front surface 2*a* of the recording paper 2 and move toward the guide 5. Accordingly, the protrusion 3 can be moved in accordance with the size of the diameter of the roll paper R to ease the tension of the recording paper 2. In addition, the protrusion 3 can be moved to flatten curling with the decrease in the diameter of the roll paper R and with the increase in the degree of curl in the recording paper 2. As described above, the roll paper printer 1 according to the embodiment can ease the tension of the recording paper 2 and also flatten curling with this simple configuration with the guide 5 and the protrusion 3. In addition, the size of the roll paper printer 1 can be reduced.

While this embodiment has been described in detail with reference to the drawings, it is to be understood that the specific configurations are not limited to these configurations according to the embodiment, and some configurations may be modified, replaced, or omitted without departing from the scope of the disclosure.

The head 7 described above is a thermal head. However, the head 7 of any print type may be used; for example, an ink jet head may be used. In such a case, the ink jet head is not able to come into contact with the transport roller 6 to nip the recording paper 2, and thus a driven roller that faces the transport roller 6 to nip the recording paper 2 may be attached to the case 14.

The protrusion 3 described above is made of a resin such as a plastic; however, the tip 3*a* of the protrusion 3 may be a metal cylinder having a diameter with a similar curvature. The metal is, for example, stainless steel. In addition, a bearing that is rotatable around the metal cylinder and is movable in the A direction and the B direction may be provided. The metal cylinder may be covered with a sheet containing ultra-high molecular weight polyethylene.

In addition, a guide section including a wall for guiding the protrusion 3 and the like may be provided around the protrusion 3 such that the protrusion 3 can smoothly move in the A direction and the B direction. The guide section may extend in the A direction and the B direction around the protrusion 3.

In addition, at least the protrusion portion 5*b* of the guide 5 that comes into contact with the recording paper 2 may be covered with a sheet containing ultra-high molecular weight polyethylene. Such a sheet reduces friction between the protrusion portion 5*b* and the recording paper 2, thereby reducing the load of the transport roller 6 in transporting the recording paper 2.

The elastic member 4 described above is fixed to the case 14; however, the elastic member 4 may be fixed to the accommodation section 12 that accommodates the roll paper R. In such a case, the accommodation section 12 illustrated in FIG. 1 and FIG. 3 may extend to an upper portion and the elastic member 4 may be fixed to the accommodation section 12. In such a configuration, the protrusion 3 is attached to the elastic member 4, and the protrusion 3 is thus provided to the accommodation section 12. In addition, a shaft may be provided at the lower rear of the case 14, and an end of a lever may be rotatably attached to the shaft and the protrusion 3 may be attached to the other end of the lever. The protrusion 3 attached to the other end of the lever is movable around the shaft. The elastic member 4 may press the protrusion 3 directly or may press the protrusion 3 via the lever.

The roll paper printer 1 described above is used with the discharge slot 13 facing forward; however, the roll paper printer 1 may be used with the discharge slot 13 facing upward. In such a case, the accommodation section 12 illustrated in FIG. 1 and FIG. 3 may extend to an upper portion and the roll paper R may be accommodated in the accommodation section 12 with the discharge slot 13 facing upward.

The surface of the recording paper 2 in contact with the protrusion 3 may be a surface other than a surface to be printed on. The roll paper R may be wound such that a surface of the recording paper 2 to be printed on faces inward. In such a case, the positions of the head 7 and the transport roller 6 are reversed to the positions illustrated in FIG. 1 and FIG. 3.

What is claimed is:

1. A roll paper printer comprising:

a case;

an accommodation section housed in the case, the accommodation section being configured to accommodate roll paper;

a transport roller housed in the case, the transport roller being configured to pull recording paper from the roll paper and transport the recording paper in a transport direction, the recording paper having a first surface and a second surface, the recording paper being ejected via an opening in a side of the case in an ejecting direction;

a guide housed in the case and positioned upstream of the transport roller in the transport direction, the guide being configured to come into contact with the second surface of the recording paper; and a protrusion housed in the case and positioned upstream of the transport roller in the transport direction, the protrusion being configured to come into contact with the first surface of the recording paper, the protrusion configured to move toward the guide, wherein the accommodation section, the guide, the protrusion, and the transport roller are aligned from a bottom of the case to a top of the case in an arrangement direction that is perpendicular to the ejecting direction, and a region at which a tip of the protrusion pushes the recording paper toward part of the guide is located directly adjacent to the transport roller.

2. The roll paper printer according to claim 1, wherein the protrusion moves in accordance with a diameter of the roll paper.

3. The roll paper printer according to claim 1, wherein a bending transport path is formed between the guide and the protrusion that face each other, and the transport path varies the bend as the protrusion moves.

4. The roll paper printer according to claim 1, wherein the guide has a recess that faces the protrusion.

5. The roll paper printer according to claim 1, wherein a curvature of a tip of the protrusion is 0.5 mm or greater and 2.2 mm or less.

6. The roll paper printer according to claim 1, wherein at least a portion of the protrusion coming into contact with the first surface of the recording paper is covered with a sheet containing ultra-high molecular weight polyethylene.

7. The roll paper printer according to claim 1, further comprising:

an elastic member configured to press the protrusion toward the guide, wherein the protrusion is pressed in a first direction by the elastic member and is pressed in a second direction opposite to the first direction by tension of the recording paper.

8. The roll paper printer according to claim 1, further comprising:

a head, wherein the head performs printing on the first surface of the recording paper.

* * * * *